United States Patent [19]

DiSalvo et al.

[11] Patent Number: 4,893,833
[45] Date of Patent: Jan. 16, 1990

[54] CLOSURE FOR AN AIR BAG DEPLOYMENT OPENING

[75] Inventors: Anthony J. DiSalvo, Allen Park; David J. Bauer, West Bloomfield, both of Mich.

[73] Assignee: Tip Engineering Group, Inc., Farmington Hills, Mich.

[21] Appl. No.: 241,893

[22] Filed: Sep. 8, 1988

[51] Int. Cl.$^4$ .............................................. B60R 21/16
[52] U.S. Cl. ...................................... 280/732; 280/728
[58] Field of Search ................. 280/732, 728, 731, 730

[56] References Cited

U.S. PATENT DOCUMENTS 3,514,124  5/1970  Richardson ........................... 280/732
4,770,439  9/1988  Maier et al. ........................... 280/732

FOREIGN PATENT DOCUMENTS 3315535  3/1984  Fed. Rep. of Germany ...... 280/732

Primary Examiner—Kenneth R. Rice
Attorney, Agent, or Firm—John R. Benefiel

[57] ABSTRACT

A closure arrangement for an air bag deployment opening formed in an auto interior, including a closure panel positioned in the opening and hinged along one side, with a frangible lock on the other side opposite the hinge, fractured by pressure exerted by the deploying inflatable cushion. In a first embodiment, the frangible lock is defined by a tab portion of a foam plastic core body of the closure panel protruding into a recess formed in an adjacent structure, or an additional lock attached to the cannister, the tab fractured by being sheared off after the inflatable cushion contacts an inside protuberance projecting from the inside of the closure panel or additional lock attached to the cannister; and, the hinge is provided by bending of an convoluted-shaped section of a formed aluminum layer defining the inner side of the closure panel. In a second embodiment, a molded plastic panel member has an inward frangible flange with tabs secured to an air bag cannister or instrument panel structure to provide the lock, and the tabs are fractured by tensile loading created by deployment of the inflatable cushion. An inwardly directed integral hinging flange is also adapted to be connected to the air cushion cannister or instrument panel structure.

17 Claims, 2 Drawing Sheets

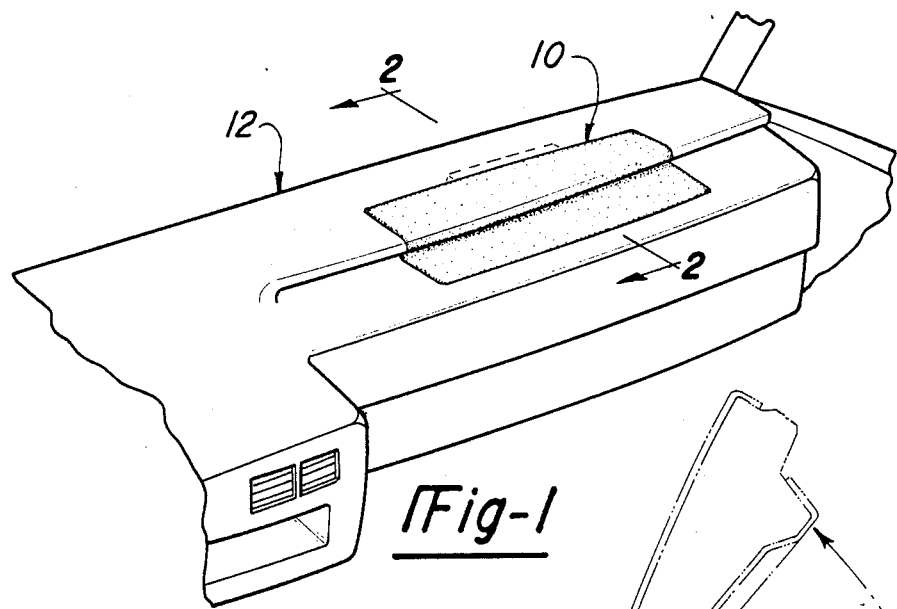
Fig-1
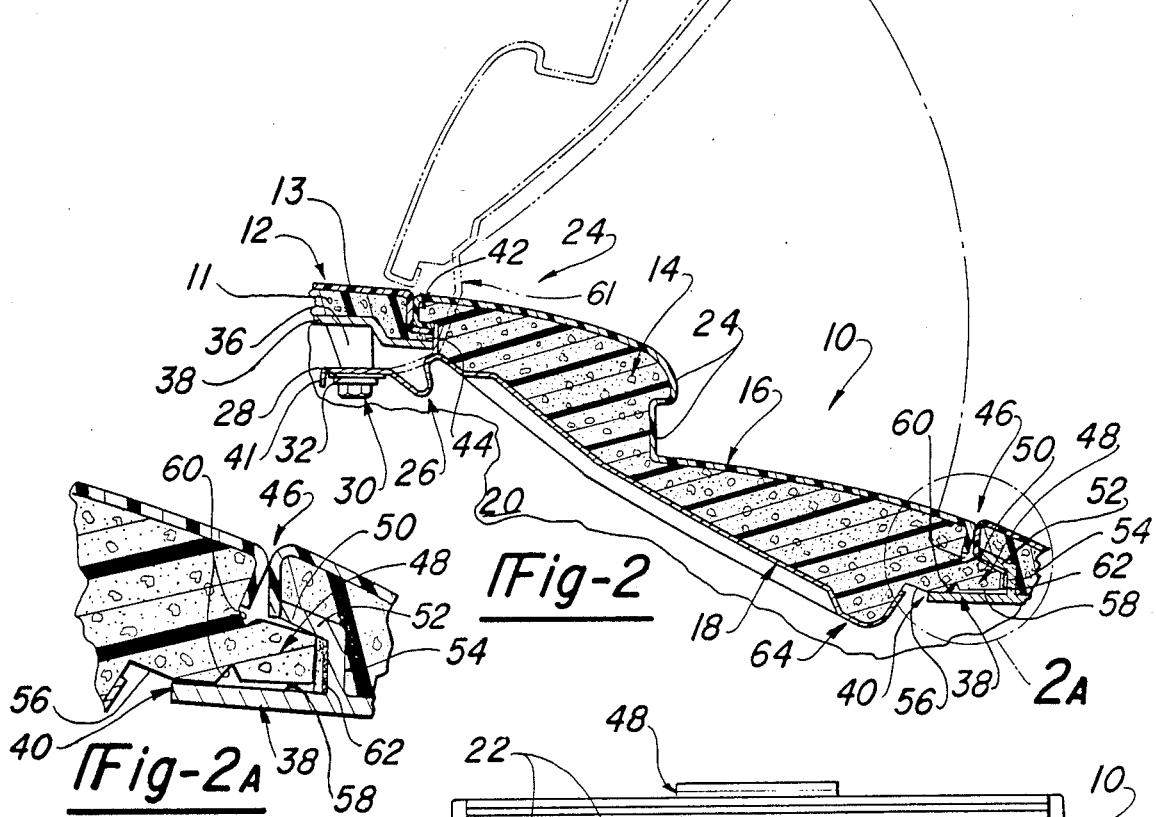
Fig-2
Fig-2A
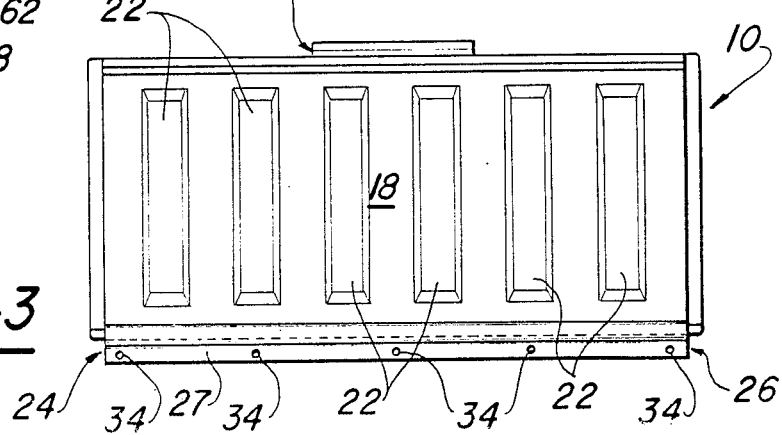
Fig-3

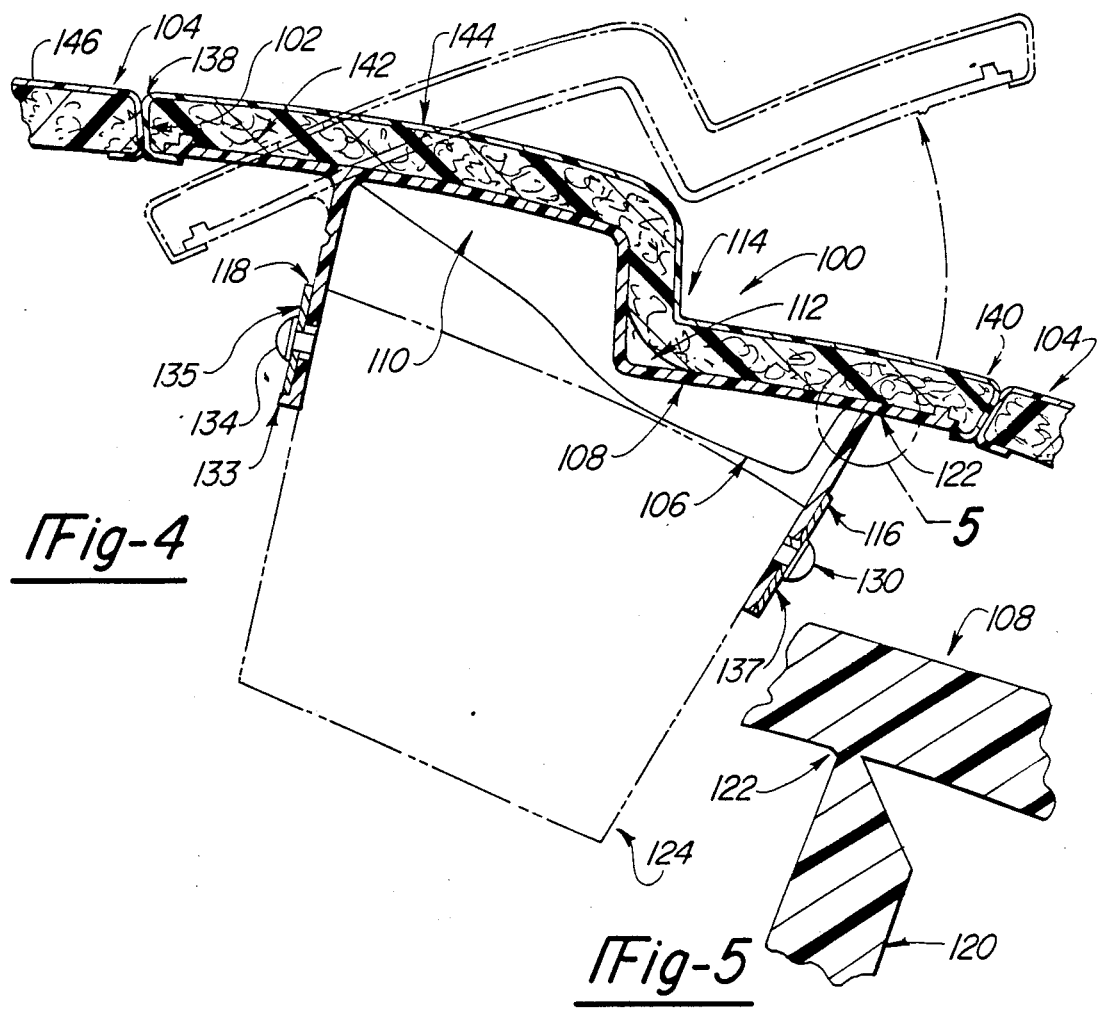
Fig-4
Fig-5
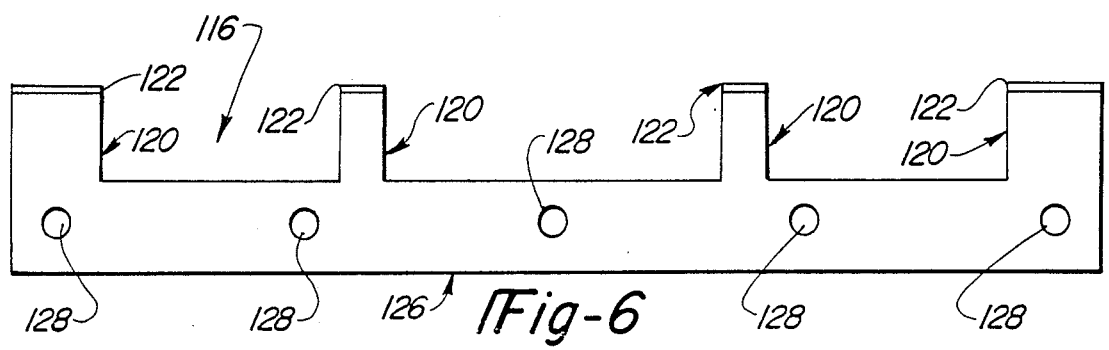
Fig-6
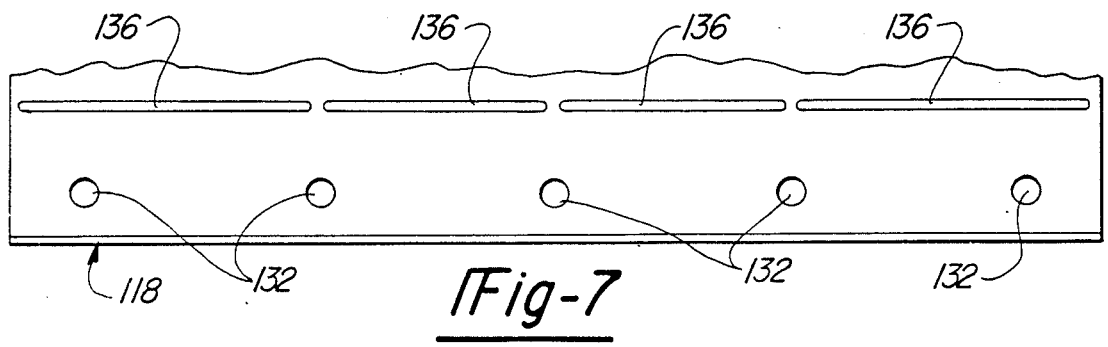
Fig-7

CLOSURE FOR AN AIR BAG DEPLOYMENT OPENING

FIELD OF THE INVENTION

This invention concerns closures and more particularly closures adapted to be operated by the deployment of an "air bag" through an opening in the interior structure of an auto, as in the instrument panel.

BACKGROUND OF THE INVENTION

Inflatable safety cushions, commonly known as "air bags", have been used as safety devices to protect the occupants of an automobile from injury as a result of a crash. The "air" bag is inflated with a gas very rapidly, as a collision is occurring to provide impact protection for an occupant. In the passenger side designs, the air bag deploys into the passenger compartment through an opening formed in the instrument panel while on the driver's side, a steering wheel housed compartment is used. The air bag safely absorbs the momentum of the driver or front seat passenger moving forward within the passenger compartment during a crash.

The cushion is stored uninflated in a compartment, and a closure is required to cover the deployment opening until activation. Such closure must be securely and permanently locked closed to protect against tampering with the air bag components such as to cause a malfunction. Particularly, the closure should not invite the placing of objects into the air bag compartment since these could become lethal projectiles when the air bag is deployed.

It is also desirable that the post deployment state of the closure provide a certain indication of the fact of deployment of the air bag.

At the same time, the closure must operate very reliably to open when needed, almost instantaneously and in such a way as to not interfere with proper deployment of the air bag. Thus only smooth contours should be contacted by the bag during deployment, avoiding the presence of sharp projections.

Since deployment of the air bag must be complete within only a few milleseconds, a typical requirement is that the closure must be open within 3 milliseconds, when operated by the pressure exerted by the air bag as it inflates, and thus a light weight structure is imperative.

The system must operate very reliably over a wide range of temperatures and other environmental conditions. For example, a 40° C. low and 105° C. high temperature standards have been proposed corresponding to commonly used design criteria applied to other automotive components, which temperature standards have not heretofore been met for air bag deployment opening closures.

For reliability and cost considerations, a simple design must be employed, utilizing a minimum number of parts. It is important that hazardous fragments from the closure itself should not be directed into the passenger compartment upon deployment.

It is thus an object of the present invention to provide a simple, lightweight, and tamper resistant closure for an air bag deployment opening which does not interfere with proper deployment of the air bag.

It is another object to provide such closure which operates reliably over a wide range of temperatures.

A further object is to provide such a closure in which the pressure of the inflating air bag is exerted for optimal effectiveness to ensure reliable and consistent opening of the closure.

Yet another object is to provide such a closure which involves a minimum number of moving parts, and which does not result in hazardous debris being showered into the passenger compartment upon opening, and which provides a certain indication of the fact of air bag deployment.

SUMMARY OF THE INVENTION

These and other objects of the present invention which will become apparent upon a reading of the following specification and claims are achieved by a closure defined at least in part by a substantially rigid panel member shaped to be fit within the deployment opening.

The closure panel is formed with an integral hinging section along one side which operates to not interfere with adjacent structures, and one or more frangible portions are provided along the other side which secure the closure panel in the closed and locked condition, but which fracture under the pressure exerted by an inflated air bag to allow the closure to be hinged open.

One or more inwardly directed protuberances extend from the inside of the panel member, contacted by the deploying air bag so as to exert maximum opening pressure and reliably cause fracture of the frangible portion and hinging opening of the closure.

In a first embodiment, the panel member is formed of a rigid foam core underlain by a thin bendable sheet layer. A tab portion formed in the foam core projects from the other side of the panel member and is received in a recess defined in part by a lip formed in the surrounding structure, the tab having a reduced thickness along a line of separation to define a frangible seam which shears under an accurately predetermined opening pressure applied by the inflating air bag.

In this version, the integral hinging is created by bending of an extension strip of the bendable sheet layer, the strip fastened along the hinging axis to the adjacent edge of a structural support layer of the adjacent structure. The extension strip is formed with a convoluted shape such as an S-shaped portion, which straightens to provide clearance past the thickness of the instrument panel surface as the pivoting action occurs.

The main portion of the foam core abuts against an underlying structural layer of the adjacent structure, to provide adequate support for the closure to resist downward pressure. A clearance space between the tab and the underlying instrument panel assures that the frangible seam will not be stressed by any pressure applied on the closure.

The bendable layer is formed of a sheet of aluminum having a series of depressions to provide adequate stiffness for the closure panel as a whole.

The edge of the tab is held with tape or adhesive to eliminate any tendency for the separated tab or fragments thereof to be hurled free and create a hazard.

In a second embodiment, the panel member is formed of a generally planar member having a series of inwardly projecting stiffening ribs in a direction extending from the opening to the hinged side of the panel. The member is also formed with downwardly projecting hinge and frangible flanges extending along the hinging and opening sides, but spaced inwardly, each secured to an air bag containing cannister.

The frangible flange comprises a series of strips joined to the main portion of the ribbed member by a reduced thickness section junction, fracturing under the tensile stress exerted by the air bag pressing on protruding portions of the ribs located adjacent the opening side of the closure. The hinging flange is formed with grooves which allow it to buckle and enable the hinge side of the closure to move in and beneath the thickness of the adjacent structure, after which the closure is free to swing open without interference.

In both versions, an outer decorative layer matches the finish of the adjacent structure, but in the second embodiment, a layer of soft foam padding overlying the panel member is used to match the less stiff feel of a surrounding padding as typically used in an instrument panel.

DESCRIPTION OF THE DRAWINGS

FIG. 1 is a fragmentary perspective view of an auto interior, illustrating a top mount instrument panel located air bag installation utilizing a closure arrangement according to the present invention.

FIG. 2 is a view of the section taken through closure shown in FIG. 1 along the line 2—2, including fragmentary portions of the surrounding instrument panel structure.

FIG. 3 is a plan view of the undersurface of the closure shown in FIGS. 1 and 2.

FIG. 2A is an enlargement of the frangible seam portion of the section shown in FIG. 2.

FIG. 4 is a sectional view of an installed closure according to a second embodiment of the present invention, with the closure shown partially open in phantom.

FIG. 5 is an enlargement of the sectioned area 5—5 in FIG. 4.

FIG. 6 is a plan view of the frangible flange portion of the closure of FIG. 4, shown separated from the remaining portions thereof.

FIG. 7 is a plan view of the hinging flange portion of the closure of FIG. 4 shown separated from the remaining portions.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims. In particular, the invention will be shown used in a front passenger side air bag installation in the top of an instrument panel, but this is only by way of illustration, as the closure arrangement of the invention may be used with many different installations.

FIG. 1 illustrates the location of the closure 10, recessed into a deployment opening formed into a top section of the instrument panel 12 of the automobile. The closure 10 is configured to match the contours of the upper surface of the instrument panel as shown.

FIG. 2 depicts the details of construction of the generally rectangular closure 10 and the adjacent portions of the surrounding instrument panel structure 12 in which is formed the opening 40 to allow deployment of the air bag (not shown) from a space 20 below the closure 10. The closure 10 is formed of a rigid panel member comprised of the combination of a core body 14 of a lightweight rigid foam plastic, such as Dytherm (TM) Styrofoam (TM) plastic bonded to an inner supporting layer 18 as may be constructed of a formed sheet of aluminum, which strengthens the panel member and provides a durable surface immediately above the space 20. The stiffening effect is enhanced by a series of formed depressions 22 arranged across the width of the closure 10.

An outer skin 16 matching the instrument panel finish such as vinyl, is bonded to the outer surface of the core body 14.

The closure 10 is formed with contour features 24 matching the adjacent contours of the instrument panel 12.

The instrument panel 12 is also constructed of a three layer sandwich of an outer vinyl layer 11, a foam core body 13, underlain by the reinforcing structural support layer 38, which has the rectangular opening 40 formed therein defining the opening through which the air bag is deployed, and which is covered by the closure 10 configured to be interfit therewith.

The closure 10 is hinged along one edge 24 (here at the rear) so as to be swung up from opening 40 along the one side to enable deployment of the air bag through the opening 40. Hinging means is provided for this purpose, constituted by a rearwardly projecting convoluted shaped extension strip 26, shown in an "S" of the aluminum support layer 18. The extension strip 26 has a straight terminal portion 27 secured beneath a clamping plate 28 compressed beneath a spaced series of bolts 30 and washers 32. Bolts 30 pass through holes 34 formed in terminal section 27 and are threadably received in mounting posts 36 integral with structural support plate 38 underlying the instrument panel 12.

A lip 41 is formed along the edge of the terminal section 27 impeding tear out of the bolts 30 through the holes 34.

The S-section 26 holds the closure 10 down in its closed position, but is extensible under the pressure of contact with the air bag to move the one hinging side of the closure 10 up and enable clearance past the interfit portion of the instrument panel 12 and closure 10, as shown in phantom at 61 in FIG. 2.

The front and side edges of the closure 10 and the front and side edges of the opening 40 are formed with interfit overlapping lips 42, 44. Lip 44 of the instrument panel 12 lies beneath the lip 42 of the closure 10, so that the front and side edges of the closure 10 are supported by the instrument panel 12.

The pivoting opening of the closure 10 about the hinge means is controlled by a frangible seam located along the front edge 46 of the closure 10. The frangible seam is comprised of a projecting tab portion 48 integral with the foam core body 14, received within a recess 50 formed into the adjacent instrument panel structure 12. The recess 50 is defined by an overlying lip portion 52 of a projecting web 54 integral with the structural support layer 38 forming a part of the instrument panel 12. A shoulder 56 is formed in the core body 14 adjacent the tab 48 which rests on the structural panel 38 to support the same. The tab 48 is relieved to provide a clearance space 58 between the structural panel 38 and the tab 48, insuring that the tab 48 cannot be stressed by downward pressure on the closure 10.

The tab 48 extends for a limited portion of the width of the rear edge of the closure 10, and further has a narrowed portion formed by a pair of vee grooves 60 located at the desired line of separation. This location is at the interface between the rear edge of the closure 10 and the adjacent edge of the instrument panel 12.

The area of cross section between the grooves 60 is calculated to give the proper shearing strength for opening of the closure 10 at the proper bursting pressure applied by the air bag.

To secure the tab 48 to the inside surface of web 54, the rear edge of the tab 48 is covered with a strip of double faced adhesive tape 62 or a quantity of adhesive to prevent escape and/or fragmentation of the tab 48 after it is sheared off, and hence avoid launching of the tab 48 or fragments thereof into the auto interior when the closure 10 is opened.

It is critical that the closure 10 respond reliably to the shearing pressure exerted by the deploying air bag, and for this purpose a protuberance 64 is formed by the inside surface of the closure 10, located immediately adjacent to the frangible seam. This insures that the air bag will make contact with the closure 10 at a defined location whereat it can exert maximum shearing pressure to the frangible seam.

Accordingly, the air bag will shear the tab 48 from the remaining portions of the body core 14, and force open the closure by bending and straightening of the S-section 26, pivoting the closure 10 open to allow deployment of the air bag.

The design is lightweight and simple, yet will operate very reliably over a wide range of conditions, including at extremely low temperatures.

Referring to FIGS. 4-7, a second embodiment of the present invention is shown.

The closure 100 of the second embodiment also is configured to be fit within a deployment opening 102 formed in the instrument panel 104 to cover the opening when in its normal closed position.

The closure 100 also includes an inner contact surface 106 for the air bag, here provided by a molded plastic member having a generally planar layer portion 108, a series of stiffening transverse inner ribs 110 and outer webs 112 bridging a contour matching step 114 in the planar layer portion 108. The layer portion 108 also includes an integral frangible flange 116 and a hinging flange 118 extending inwardly from the inside of the closure 100, and parallel to the opening and hinging sides of the closure 100, but spaced inwardly thereof. The frangible flange 116 includes one or more tabs 120 integral with the layer portion 108, joined by reduced cross-section areas 122. The frangible flange 116 is fastened to an air bag containing cannister 124 by a strip portion 126 joining the tabs 120 at their ends opposite the ares 122. The strip 126 has a series of holes 128, each adapted to receive a fastener 130 securing the same to the side of the air bag cannister 124 beneath a clamping plate 137. The air bag cannister 124 is mounted beneath the instrument panel 104, aligned with the opening 102, by conventional structure not shown in FIG. 4.

The hinging flange 118 comprises a depending strip also formed with a series of holes 132 receiving fasteners 134 securing the same to the opposite side of the air bag cannister 124 beneath a clamping plate 135, with a strengthening rib 133 preventing tear out of the fasteners 134. A series of grooves 136 extend across the hinging flange to create a line of weakening to cause the hinging flange 118 to buckle, enabling the end 138 to snap under the adjacent structure of the instrument panel 104 as the opening end 140 lifts up, and thereafter enable free swing up of the closure 100 without interference.

In this embodiment, a soft foam pad layer 142 overlies the rigid panel member 108, matching the less stiff feel of the conventional instrument panel pad. The outer layer is wrapped with a decorative vinyl layer 144, matching the vinyl layer 146 wrapped around the instrument panel 104.

The ribs 106 extend out to create a protuberance adjacent the frangible flange 116, so that contact of the deploying air bag therewith is insured, establishing effective tensile breaking pressure on the areas 122. This produces reliable fracturing of the flange 116 and opening of the closure 100.

Thus a tamper proof frangible lock has been provided for a hinged closure fit to a deployment opening, which is simple and yet has been found to be reliable over a wide range of temperature and other conditions.

No projections are contacted by a deploying air bag, nor hazardous debris generated upon opening. A smooth outer appearance, and an opening free, tamper resistant exterior is also provided.

We claim:

1. A closure arrangement for an opening defined within an auto interior structure, said opening adapted to accommodate deployment of an inflatable safety cushion through said opening, said closure arrangement comprising:

a closure panel member configured to be interfit into said opening;

hinging means operatively associated with one side of said closure panel to enable outward pivoting of said of said closure panel away from said opening;

frangible locking means extending along another side of the said closure panel member than said side associated said hinging means, said frangible locking means normally locking said closure panel to prevent hinging open of said closure, said frangible locking means comprising interfit projecting and recess rigid portions each respectively affixed to one of said auto interior structure or said closure panel member mating together to create a lock therebetween preventing hinging opening of said closure panel by shear loading of said projecting portion, said projecting portion shearing free upon exertion of a predetermined outward pressure on said closure panel member applied by said inflatable cushion as it begins to be deployed towards said opening.

2. The closure arrangement according to claim 1 wherein said closure panel member includes a rigid foam plastic core body and wherein said frangible locking means includes a tab comprising said projecting portion, said tab integral with said core body and also includes a recess formed in said auto interior structure comprising said recess portion, said recess receiving said tab, said tab placed under shearing stress applied thereacross by said pressure applied by said deploying inflatable cushion.

3. The closure arrangement according to claim 2 wherein said tab is formed with opposing grooves reducing the transverse thickness thereof along the length thereof.

4. The closure arrangement according to claim 2 wherein said adjacent portions of said interior structure includes a metal sheet layer having a portion underlying said tab, with a clearance space therebetween, said metal sheet portion extending beneath the main part of said core body to support the same against inward pressure exerted on said closure panel.

5. The closure arrangement according to claim 2 further including an adhesive connection between said tab and said recess acting to prevent said tab from escaping said recess after shearing off of said tab.

6. The closure arrangement according to claim 2 wherein said closure core body is constructed of Dytherm plastic.

7. The closure arrangement according to claim 1 wherein an inside surface of said closure panel member is formed with an inwardly extending protuberance located adjacent said frangible locking means, said protuberance located to be contacted by said inflatable cushion during deployment thereof.

8. The closure arrangement according to claim 1 wherein said closure panel is formed with a core body of foamed plastic, an inside layer of sheet aluminum, and an outside finish layer.

9. The closure arrangement according to claim 8 wherein said hinge means comprises a portion of said inside layer extending beyond said core body along said one side of said closure panel, and means fixing said portion to the adjacent instrument panel structure, bending of said portion providing a hinging action.

10. The closure arrangement according to claim 9 wherein said portion is convoluted, to enable movement of said one side of said closure panel member out of said opening by straightening of said convoluted shape, with bending thereof producing pivoting of said closure panel member out of said opening.

11. A closure arrangement for an opening defined within an auto interior structure, said opening adapted to accommodate deployment of an inflatable safety cushion through said opening, said closure arrangement comprising:

a closure panel member configured to be interfit into said opening;

hinging means operatively associated with one side of said closure panel to enable outward pivoting of said closure panel away from said opening;

frangible locking means extending along the other side of the said closure member opposite said hinging means, said frangible locking means normally locking said closure panel to prevent hinging open of said closure, but fracturing free upon exertion of a predetermined outward pressure applied by said inflatable cushion as it begins to be deployed towards said opening; said closure panel member comprises a molded plastic member having an integral, inwardly directed frangible flange extending along said other side of said closure adpated to be secured to an air bag cannister, said frangible flange having one or more areas of reduced thickness tensiooned by deployment of said air bag so as to be fractured and release said other side of said closure.

12. The closure arrangement according to claim 11 further including an integral hinging flange extending inwardly and along said one side of said closure adapted to be fastened to said air bag cannister.

13. The closure arrangement according to claim 11 wherein said frangible flange comprises a series of spaced tabs joined to the molded plastic panel member at a junction therewith comprising said areas of reduced thickness.

14. The closure arrangement according to claim 11 wherein said hinging flange is formed with one or more grooves extending across the width thereof to produce a line of reduced stiffness, enabling buckling of said hinging flange and dropping of said one side beneath said adjacent interior structure.

15. The closure panel according to claim 11 further including a soft foam pad mounted atop said molded plastic member.

16. The closure arrangement according to claim 11 wherein said plastic member is formed with a series of elongated stiffening ribs extending transversely from side to side.

17. The closure according to claim 16 wherein said ribs protrude downward to a greater extent on the end adjacent said frangible flange, whereby said air bag first contacts said end of said ribs adjacent said frangible flange upon deployment thereof.

* * * * *